2,531,096

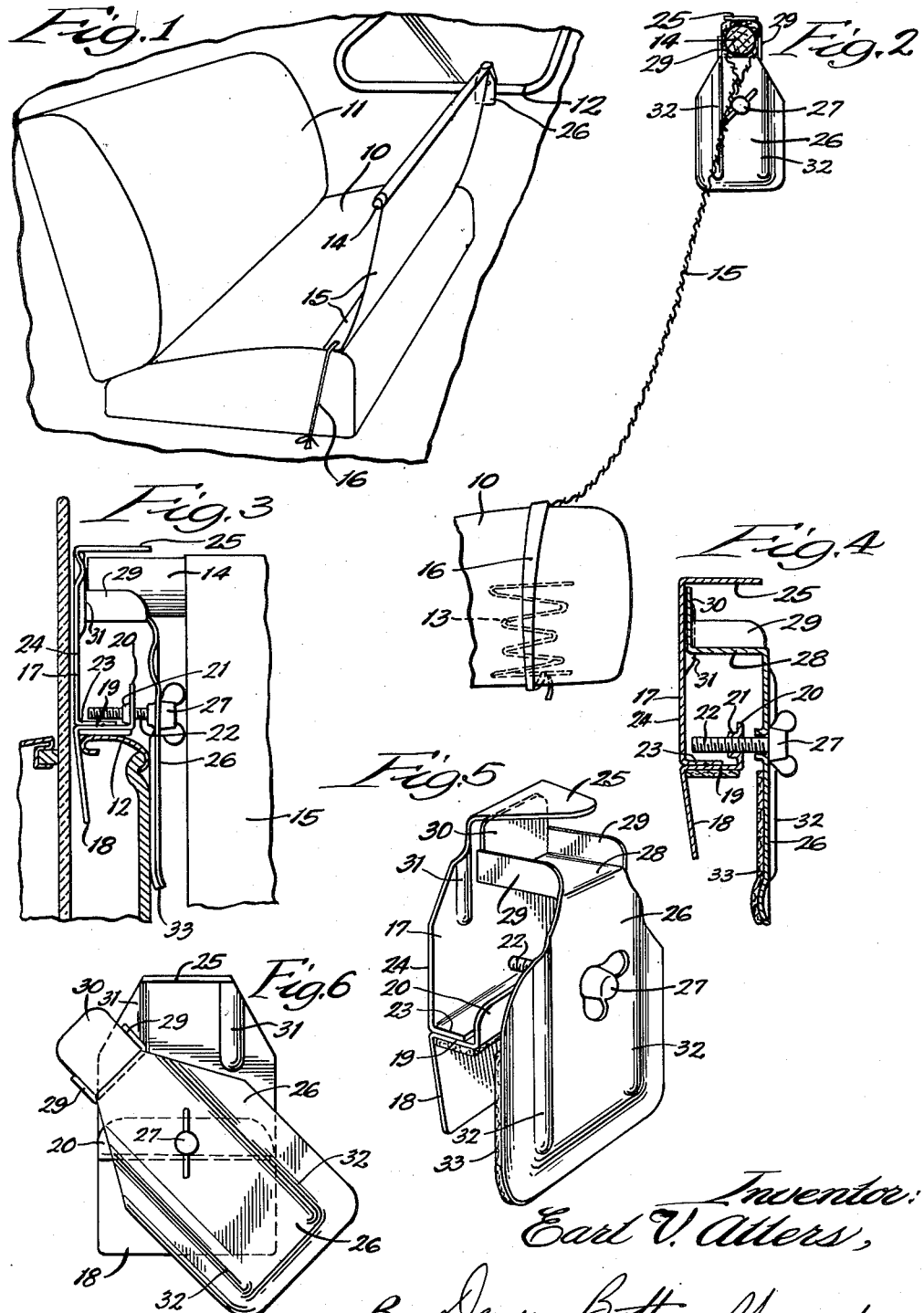
Nov. 21, 1950 — E. V. ALLERS — 2,531,096
CURTAIN WALL SUPPORT FOR AUTOMOBILE SEATS AND THE LIKE
Filed Sept. 28, 1946
Inventor: Earl V. Allers Patented Nov. 21, 1950

UNITED STATES PATENT OFFICE 2,531,096

CURTAIN WALL SUPPORT FOR AUTOMOBILE SEATS AND THE LIKE

Earl V. Allers, Chicago, Ill.

Application September 28, 1946, Serial No. 700,060

2 Claims. (Cl. 5—94)

1

This invention relates to a curtain wall support for an automobile seat and the like. The invention is particularly useful in supporting a curtain or web in front of the rear seat of an automobile to provide an enclosure for an infant.

Enclosures for the rear seat of an automobile have heretofore been provided consisting of rigid frame enclosures and also consisting of flexible supports suspended from window frames in line with the front portion of the rear seat. The rigid frame structures have been unsatisfactory because they provide rigid hard surfaces against which the infant may be thrown and because of the bulky character of the structure, expense involved, and the difficulty of setting up the frame structures satisfactorily. The suspended curtain devices have been unsatisfactory because the curtain is suspended at too low an angle, flush with the bottom of the window frame, and the central portion of the flexible element tends to sag after use for a while, so that the infant is not protected along the central portion of the element. Further with such suspended devices, the hooks engaging the sills may slide backwardly under stress.

An object of the present invention is to provide a structure wherein rigid rod or pole is suspended at a spaced distance above the window frames on opposite sides of the seat, with the result that the protection afforded the child at the center of the seat is equal to the protection afforded along the sides of the seat. A further object is to provide such a supporting structure in which the rod or pole is held securely in position upon the window frames, while at the same time providing means for tilting the supporting structure to effect a quick release of the pole. A further object is to provide a web pole supporting member with means which may be readily attached to the window frame and which rigidly maintains the pole in position while at the same time providing adjustable means for quick release of either end of the pole. A still further object is to provide a web or curtain supporting structure carried upon the window frames at a spaced distance thereabove while providing means for locking the lower portion of the curtain to the lower portion of the automobile seat. Yet another object is to provide in combination a rigid supporting member for a curtain enclosure carried by the window frames of an automobile while providing resilient means for supporting the lower end of the curtain upon the seat. Other specific objects and advantages will appear as the specification proceeds.

2

The invention is illustrated, in a preferred embodiment, by the accompanying drawing, in which—

Figure 1 is a perspective view of an automobile equipped with a curtain enclosure device embodying my invention; Fig. 2, a broken side view in elevation; Fig. 3, a vertical sectional view of the side view of the wall showing the clamping device for supporting the curtain pole secured to the wall; Fig. 4, a transverse sectional view of the clamping members employed; Fig. 5, a perspective view of the structure shown in Fig. 4; and Fig. 6, a front view in elevation of the clamping structure shown in Fig. 4 but showing the forward clamping member turned laterally to free the pole for removal or for insertion.

In the illustration given, 10 designates the rear cushion of an automobile provided with a back 11. 12 designates the window frame of the automobile, one frame being provided at each side of the seat. The seat 10 is provided with the usual springs 13 which are accessible from the bottom side of the cushion 10.

In the curtain supporting structure, I provide a rigid pole or rod 14 about which the web or fabric 15 forming the curtain may be stitched. The curtain 15 extends downwardly to the top of the seat cushion 10 and is provided on either side at its lower end with the laterally-extending tape members 16 which may be drawn downwardly and tied to the bottom of the bottom portion of spring 13, thus providing a resilient tie member for the lower portion of the web 15.

The rod 14 may be supported upon the window frames 12 in any desired way. I prefer to provide a support member 17 having a lower portion 18 adapted to be inserted against the outer portion of the window frame 12 and having a horizontal portion 19 adapted to rest upon the top of frame 12. The member 19 is provided with a vertically-extending forward portion 20 having a hub 21 threaded to receive a clamping member 22. Welded or otherwise secured to the horizontal leg 19 is a horizontal member 23 having a vertically-extending body 24. The portion 24 of the support 17 has preferably its top portion tapering inwardly and having its extreme top portion 25 bent forwardly to a horizontal position so as to serve as a retainer for the pole.

The outer clamping member 26 carries the rotatable wing nut 27 fixed to the screw 22 so that the member 26 may be drawn toward the support 17. The member 26 is provided at its top with a horizontally-extending body 28 adapted to receive the pole and with upwardly-extending side flanges 29 for maintaining the pole in position. An integral stop member 30 extends upwardly between the side walls 29. The pole-supporting members 28, 29 and 30 are adapted to lie within a spaced pair of ribs 31 formed in the member 24 so that when the member 30 is drawn inwardly against the wall 24, it is prevented from moving laterally by the ribs 31. The front wall of the support 26 is preferably provided with vertical ribs 32 for strengthening the wall and on the inner side of the wall is provided a cushion member 33 formed of rubber, felt, or any other suitable material for protecting the side wall of the car against the clamping force applied.

In the operation of the structure, the pole 14 is inserted within the loop of the web or curtain 15, and the ends of the pole are secured within the socket provided by the portions 28, 29 and 30 of the clamping member 26 when the clamping member 26 is tilted laterally to the position shown in Fig. 6. The member 26 is then swung to the position shown in Figs. 3 and 5, and the wing nut 27 is turned to force the member 26 toward the clamping support 17. This operation brings the wall 30 between the ribs 31 of the member 17 so as to prevent lateral movement of member 26. By this means, the ends of the pole are firmly held upon the window frames of the car and also at a spaced distance above each frame.

The web 15 is brought downwardly upon the front top portion of seat cushion 10 and the taped members 16 are preferably drawn under the seat and tied to the springs of the cushion. The latter operation gives a resilient attachment for the lower end of the curtain 15. It will be understood that the tape 16 may be secured to any suitable means for locking the web 15 in position. Further, if desired, the web 15 may be extended rearwardly and tucked between the meeting portions of cushions 10 and 11.

With the structure shown in Fig. 1, after the web enclosure has been placed in position, as illustrated, bedding for the infant may be placed upon the cushion 10 and also about the cushion 11, as in the usual practice. It is common to remove the bedding from the crib of the infant and to place the same upon the cushion 10. The bedding thus cooperates with the tie member 16 and the rearwardly-extending flap of the sheet 15 in retaining the flap firmly upon the cushion 10.

When it is desired to remove the curtain, one of the clamping members 26 may be released by rotating the screw clamp 27 and the member 26 may be turned to the oblique position shown in Fig. 6. In this position, the pole may be readily lifted and removed from the socket and the other end of the pole may be simply withdrawn from the socket. The pole then may be drawn downwardly so that it extends over and protects the front portion of the seat. In this position, the weight of the pole tends to draw the curtain 15 about the front portion of the seat. When the child is to be placed again in the enclosure, one end of the pole is placed within the socket of the tilted device, as shown in Fig. 6. The tilted member 26 is then swung to the vertical position shown in Figs. 3 and 5 and securely locked against sidewise tilting by rotating the wing nut 27 so as to bring wall 30 between the vertical ribs 31.

In the new structure shown, it will be noted that the supporting means carries the pole ends at a spaced distance above the window frames so that there is full protection for the child across the entire seat. The vertical spacing of the socket above the window frame further permits a tilting motion of the inner clamping member so that it may swing freely to the position shown in Fig. 6 without striking the window frame and thus permitting ready disengagement of the pole.

The resilient engagement of the lower end of the curtain 15 through the tie members 16 prevents the child from becoming injured when thrown against the curtain 15 as a result of sudden stopping of the car, the springs of the cushion being thus utilized for this additional function.

The structure is extremely simple, easy to apply and to detach from the window frames, and the resulting pole structure maintained by the clamping means is rigidly held at all times except when it is desired to remove the pole.

While in the foregoing description, I have set forth certain specific details as means for illustrating an embodiment of the invention, it will be understood that such details may be modified widely by those skilled in the art without departing from the spirit of my invention.

I claim:

1. In a curtain support structure for use with an automobile having a rear seat and window frames at opposite ends of the seat and in which the curtain is secured at its lower side to the front portion of the rear seat, a rigid pole secured to the top end of the curtain and having free end portions extending therefrom, and bracket means secured to said frames and each bracket extending upwardly from the bottom portion of the window frame, said bracket means providing sockets for receiving the ends of the poles and at least one of said sockets being tiltable to release one end of the pole.

2. In a curtain support structure for use with an automobile having a rear seat and window frames at opposite ends of the seat and in which the curtain is secured at its lower side to the front portion of the rear seat, a rigid pole secured to the top end of the curtain and having free end portions extending therefrom, and bracket means secured to the bottom portion of each window frame and providing inwardly extending open sockets thereabove, said sockets being adapted to receive the ends of said pole and at least one of said sockets being tiltably supported.

EARL V. ALLERS.

REFERENCES CITED

The following references are of record in the file of this patent:

UNITED STATES PATENTS

| Number | Name | Date |
|---|---|---|
| 371,408 | Becker | Oct. 11, 1887 |
| 1,040,620 | Clark | Oct. 8, 1912 |
| 1,148,950 | Bigger | Aug. 3, 1915 |
| 1,959,974 | Westgate | May 22, 1934 |
| 2,048,955 | Showalter | July 28, 1936 |
| 2,232,194 | Zogby | Feb. 18, 1941 |